United States Patent
Hall (10) Patent No.: US 7,258,225 B2
(45) Date of Patent: Aug. 21, 2007

(54) METHOD AND APPARATUS FOR DIVERTING MATERIAL

(75) Inventor: John Hall, Winfield, WV (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 11/092,409

(22) Filed: Mar. 28, 2005

(65) Prior Publication Data

US 2005/0217976 A1 Oct. 6, 2005

Related U.S. Application Data (60) Provisional application No. 60/557,066, filed on Mar. 26, 2004.

(51) Int. Cl.
*B65G 11/00* (2006.01)
*B65G 47/34* (2006.01)

(52) U.S. Cl. ............... 198/525; 198/528; 198/539; 198/550.2; 198/562; 198/600; 198/535; 198/499; 193/16; 193/17; 193/21; 193/22

(58) Field of Classification Search ............... 198/525, 198/528, 539, 550.2, 562, 600, 535, 499; 193/16, 17, 21, 22
See application file for complete search history.

(56) References Cited

U.S. PATENT DOCUMENTS

| | | | | |
|---|---|---|---|---|
| 4,426,182 | A | * | 1/1984 | Frias et al. ............ 414/22.61 |
| 4,696,389 | A | * | 9/1987 | Schwarze ................. 198/499 |
| 4,917,231 | A | * | 4/1990 | Swinderman ............ 198/497 |
| 5,597,062 | A | * | 1/1997 | Biwer ...................... 198/600 |
| 5,911,667 | A | * | 6/1999 | Sanchis et al. ............ 53/531 |
| 6,315,105 | B1 | * | 11/2001 | Gibbs et al. .............. 198/497 |
| 6,443,294 | B1 | * | 9/2002 | Brody et al. ............. 198/499 |
| 6,681,919 | B1 | | 1/2004 | Brink |
| 6,691,861 | B2 | * | 2/2004 | Reimer et al. ............ 198/534 |
| 2003/0079956 | A1 | * | 5/2003 | Reimer et al. ............... 193/1 |
| 2004/0063529 | A1 | * | 4/2004 | Mare et al. ................ 474/109 |
| 2004/0222066 | A1 | * | 11/2004 | Hall ........................ 198/499 |

* cited by examiner

*Primary Examiner*—Gene O. Crawford
*Assistant Examiner*—Leslie A Nicholson, III
(74) *Attorney, Agent, or Firm*—Patzik, Frank & Samotny Ltd.

(57) ABSTRACT

An apparatus for diverting material in a controlled manner comprising a diverter plate attached to a mounting assembly. The diverter plate is shaped for receiving falling material and facilitating the flow of the material onto a conveyance means or into storage. The mounting assembly comprises a carrier spring assembly that permits the diverter plate to pivot about a shaft and thereby move from a default position to an unload position. The mounting assembly further comprises two adjustable locking mounts that hold the shaft in place and also allow the shaft to be adjustably rotated and thereafter fixed in place. A method for diverting material in a controlled manner comprises the steps of installing the apparatus at a transfer point and activating a first conveyance means that feeds material to the chute. A second conveyance means that receives the material after diversion by the apparatus can optionally be activated.

27 Claims, 9 Drawing Sheets

METHOD AND APPARATUS FOR DIVERTING MATERIAL

CROSS-REFERENCES TO RELATED APPLICATIONS

This application claims the benefit of U.S. Provisional Application Ser. No. 60/557,066 filed Mar. 26, 2004.

BACKGROUND OF THE INVENTION

1. Field of the Invention

This invention relates to transfer points on conveyor belts or other means of conveyance, and more specifically, to an apparatus and method for diverting or directing the flow or movement of material from one means of conveyance such as a first conveyor belt to another means of conveyance such as a second conveyor belt or into storage.

2. Description of the Related Art

Conveyor belts are often used to transfer large quantities of materials, such as mineral ores, from one location to another. Transfer points are frequently needed at junction points between two such conveyor belts when the material must be transported in a new direction or at a lower elevation. At these transfer points, material dumps from an initial or first conveyor belt into a chute and onto a subsequent or second conveyor belt. The material typically drops from about 2-3 feet to about 10-20 or more feet in vertical height at transfer points. A frequent problem encountered when using conventional transfer point equipment is that when the material hits the second conveyor belt under the chute, the force of the material impacting against the second conveyor belt causes belt damage such as cuts and/or holes in the conveyor belt surface. Currently, impact beds or impact rollers made of rubber or urethane are used to help absorb impact to the belt, and to therefore prolong the life of the belt. Although conventional impact beds and impact rollers provide some degree of conveyor belt protection through impact absorption, they are not designed to slow and/or redirect the flow of the falling material in order to provide significantly increased levels of conveyor belt impact protection.

Another problem often encountered with the use of conventional transfer point equipment is that some of the material tends to fall off of the second conveyor belt. Although an external skirt board is generally used at transfer points to try to seal the conveyor belt, the material usually hits the second conveyor belt with such a high force that the material blows out the back and sides of the external skirt board. This leads to lost material, increased clean-up costs, and damage to external skirt boards and other nearby equipment.

Conveyor belt cover damage is very costly to repair. Cuts in the surface trap material that later comes out of the cuts and can accumulate on the conveyor belt rollers, thereby damaging the rollers and requiring costly roller replacement. Adjusting and/or replacing worn out external skirt board is costly as well.

In order to alleviate the need for such costly repair and clean-up, new chutes are currently being designed and manufactured. Such attempts to solve the aforementioned problems associated with conventional conveyor belts and transfer points are not only very costly in and of themselves, there is also no convenient method for making adjustments to these pre-manufactured fixed chutes without major cost expenditures.

For the foregoing reasons, there is a need for an inexpensive, convenient, adaptable, durable, and effective apparatus and associated method for reducing impact damage to conveyor belts and for reducing material spillage at transfer points.

SUMMARY OF THE INVENTION

The present invention is directed to an apparatus and associated method that satisfies the need for an inexpensive, convenient, adaptable, durable, and effective tool for reducing impact damage to conveyor belts and for reducing material spillage at transfer points. It can minimize conveyor belt damage, premature roller failure, and clean-up of spilled material, thereby extending the useful life of conveyor belts and associated equipment. It can also eliminate the need for newly-designed costly chutes, impact beds, and external skirt boards. An embodiment of the apparatus of the present invention comprises a diverter plate and a mounting assembly. The diverter plate provides a path upon which material falling through a conveyor belt transfer point chute from a first conveyor belt falls and is diverted such that the material subsequently falls more gently in a controlled manner onto a second conveyor belt. The diverter plate is made out of any sufficiently durable material, such as metal, plastic, and/or composites, that is suitable for use with the material being conveyed. The diverter plate also has a length, width, and thickness that is compatible with the dimensions of the chute and the weight of the material being conveyed. The diverter plate additionally has a shape that facilitates diversion of the conveyed material in a desired fashion. Thus, the diverter plate can be V-shaped, concave, flat, or any similar shape, depending on the type and size of chute and/or depending on the conveyed material. The diverter plate may have vertical sides, and may have a vibrator to assist in the flow of the material.

The diverter plate is positioned in, on, or under the chute using the mounting assembly. The mounting assembly is adjustable from outside the chute such that the angle of the diverter plate can be easily and conveniently set and thereafter changed. For example, the diverter plate may be positioned horizontally or may be angled downward toward the second conveyor belt. The mounting assembly comprises a carrier spring assembly and an adjustable locking mount. The carrier spring assembly, in turn, comprises a bracket to which the diverter plate is attached, a spring that permits resilient rotational motion of the bracket, and a shaft around which the bracket rotates. The adjustable locking mount adjustably fixes the shaft in a desired position relative to the chute. The adjustable locking mount comprises a base plate assembly that attaches the mounting assembly to the chute, a bushing that guides the shaft, and an external locking disc assembly that adjusts the positioning of the shaft. A dust seal placed around the adjustable locking mount where it contacts the chute minimizes dust emissions emanating from within the chute.

In use, the apparatus of the present invention absorbs the impact of material falling through the chute and diverts the flow of the material in a desired direction onto the second conveyor belt such that wear and tear on the second conveyor belt is minimized. As the material falls onto the diverter plate of the apparatus, the force of the falling material rotates the bracket about the shaft thereby pushing a bottom end of the diverter plate downward toward the second conveyor belt in an unload position. This pivoting action of the diverter plate thereby facilitates the flow of the material off the edge of the bottom end of the diverter plate and onto the second conveyor belt. The spring continually urges the bracket to counter-rotate back to its original, default position. The diverter plate is adjustable in height and angle relative to the second conveyor belt using the adjustable locking mount.

Thus, the apparatus of the present invention is an adjustable, impact absorbing material diverter and flow control device. It is easy to install on existing chutes, and it is easy to adjust from outside the chute such that the angle of the diverter plate can be positioned to minimize impact force on the second conveyor belt by the falling material.

The present invention is not restricted to use with chutes and conveyor belts, but may also be used at any transfer point where bulk material or packaged material flows from one means of conveyance to another means of conveyance or into storage. For example, the present invention is suitable for use in directing the flow of any bulk material and/or packages of any material, such as sacks of cement. The present invention is also suitable for use at loading points, stacking points, discharge points, and other transfer points, and is suitable for use at multiple transfer points.

An embodiment of the method of the present invention comprises the steps of installing an apparatus of the present invention on a conveyor belt transfer point chute, activating a first conveyor belt that feeds material to the chute, and activating a second conveyor belt that receives the material from the chute, wherein the apparatus of the present invention diverts the material as the material falls from the first conveyor belt to the second conveyor belt.

BRIEF DESCRIPTION OF THE FIGURES

The present invention is described with reference to the accompanying drawings. In the drawings, like reference numbers indicate identical or functionally similar elements.

DETAILED DESCRIPTION OF THE PREFERRED EMBODIMENTS

Figure 1:
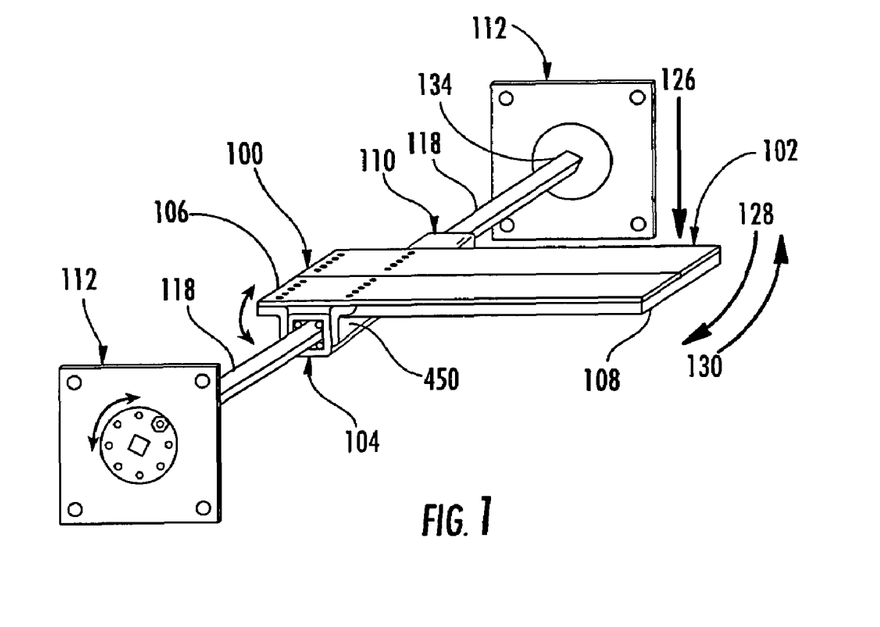
FIG. 1 is a perspective view of an embodiment of the flow control apparatus of the present invention.
Figure 2:
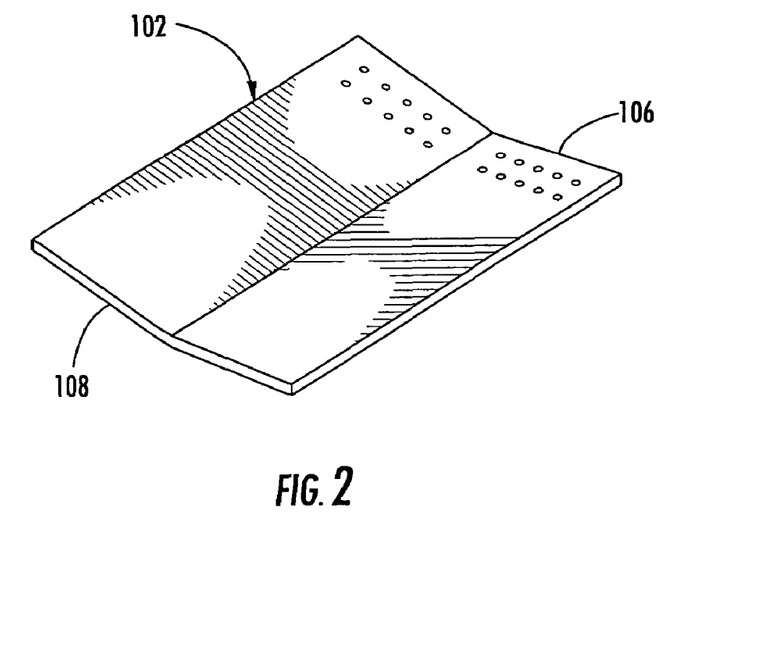
FIG. 2 is a perspective view of a diverter plate of the flow control apparatus of FIG. 1.

As shown in FIG. 1, the flow control apparatus 100 comprises a diverter plate 102 attached to a mounting assembly 104. The diverter plate 102 has a top end 106 and a bottom end 108. The diverter plate 102 has a flat or planar rectangular shape, a V-shape with a trough along the midline of the length of the diverter plate 102, a concave shape with a trough along the length of the diverter plate 102, or a similar shape that facilitates a flow of conveyed material along the length of the diverter plate 102 such as U-shaped, cup shaped, or spoon shaped. The diverter plate 102 may also have vertical sides. One embodiment of the diverter plate 102 as shown in FIG. 2 comprises a rectangular stainless steel plate with a thickness of about one-half of an inch, a width of about twenty-four inches, a length of about thirty inches, and a V-shaped trough along the midline of the length of the diverter plate 102 having an internal angle of about one hundred sixty-one degrees. The diverter plate 102 can alternatively be any thickness, width, and/or length depending on the particular application and/or the size of the chute or other machinery to which the flow control apparatus 100 is mounted. The diverter plate 102 can also alternatively be made of any similar material of suitable strength and durability such as metal, steel, wear plate, ultra high molecular weight polyethylene, TEFLON and other synthetic resinous fluorine-containing polymers, ceramic, plastic, and urethane compounds. The diverter plate 102 is attached to the mounting assembly 104 at the top end 106 of the diverter plate. Therefore, the top end 106 has two rows of three-quarter inch diameter holes on two inch centers spaced along the width of the top end 106, each row having ten holes. These holes accommodate bolts that attach the diverter plate 102 to the mounting assembly 104. Other means of attaching may alternatively or additionally be used, such as pins, pegs, clamps, clips, fasteners, couplers, joints, dowels, rivets, screws, glue, adhesive, hinges, hooks, clasps, latches, nails, welding, and similar securing means, in which case the holes may be unnecessary. The diverter plate 102 may optionally have a vibrator 450 that vibrates the diverter plate 102.

Figure 3:
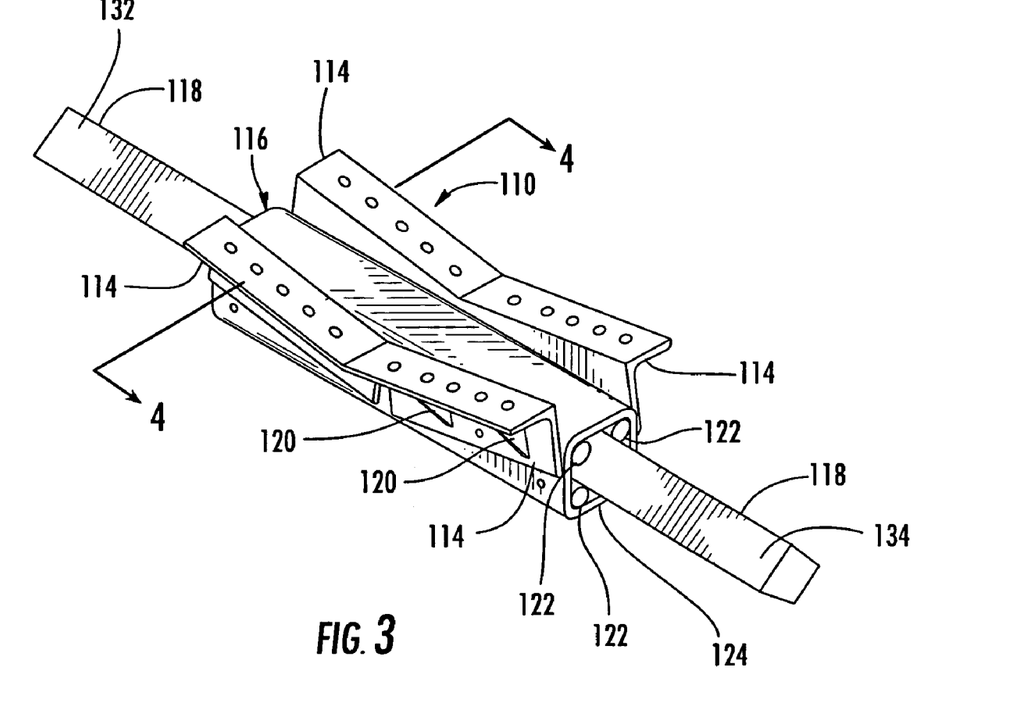
FIG. 3 is a perspective view of a carrier spring assembly of the flow control apparatus of FIG. 1.
Figure 4:
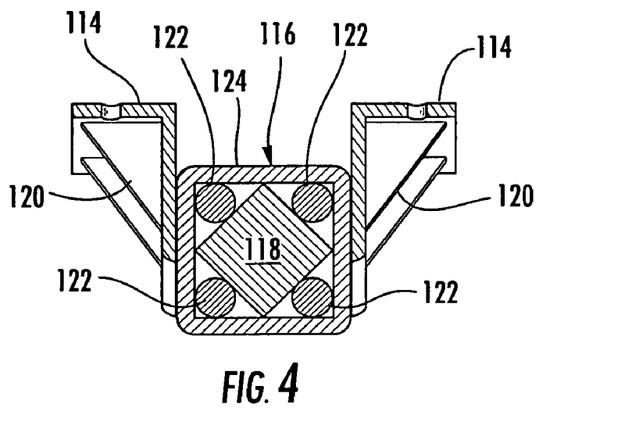
FIG. 4 is a cross-sectional view at line 4-4 of the carrier spring assembly of FIG. 3.

As shown in FIG. 1, the mounting assembly 104 comprises a carrier spring assembly 110 and two adjustable locking mounts 112. As shown in FIG. 3, the carrier spring assembly 110 comprises a bracket 114 to which the diverter plate 102 is attached, a spring 116 that permits resilient rotational motion of the bracket 114, and a shaft 118 around which the bracket 114 rotates. The bracket 114 comprises four angle pieces of three-eighths inch thick metal attached directly or indirectly to the spring 116, each angle piece having five holes, and the angle pieces arranged to conform to the shape of the diverter plate 102 such that the holes in the bracket 114 align with the holes in the diverter plate 102. The bracket 114 is bolted to the diverter plate 102 as previously described, and supports the diverter plate 102 in its desired position. If alternate means for attaching the diverter plate 102 to the mounting assembly 104 are used as previously described, then bracket holes may not be needed. One or more gussets 120 optionally reinforce the bracket 114. Alternative numbers and/or shapes of angle pieces or brackets 114 may be used. The bracket 114 is welded to the spring 116 as shown in FIGS. 3 and 4. The bracket 114 may alternatively be attached directly or indirectly to the spring 116 using pins, pegs, clamps, clips, fasteners, couplers, joints, dowels, rivets, screws, glue, adhesive, hinges, hooks, clasps, latches, nails, welding, or similar securing means. The carrier spring assembly 110 is preferably substantially made of the same types of materials as the diverter plate 102.

As shown in FIGS. 3 and 4, the spring 116 comprises a number twelve size neidhart-type rubber torsion spring having a seven thousand foot-pound maximum capacity. This spring size and capacity is specifically for lighter duty applications and is variable, depending upon the type and weight of material 400 being conveyed as well as the size of the chute. The use of other spring sizes and capacities for other applications, including heavy duty applications, would be readily apparent to one having ordinary skill in the art. For example, industry standards such as the Conveyor Equipment Manufacturers Association standard number 5745-2000 can be consulted for guidance regarding maximum capacity. The spring 116 has four rubber dampers or cords 122 located along the four corners of a square tube holder 124. The square tube holder 124 preferably has a length between about twenty-four and about forty-eight inches, although these dimensions can vary depending upon the application. The spring 116 can alternatively be a round coil spring, an automotive leaf spring, or other spring type, such as an air bag, water bag, or hydraulic means, depending on the particular application. The spring 116 size, type, and shape likewise depends on the type and weight of material conveyed and the height of the chute. The shaft 118 comprises a two inch square metal bar about six or six and one-half feet long located within and sticking out the ends of the square tube holder 124. These dimensions likewise may vary depending on the particular application. The shaft 118 has a first end 132 and a second end 134. This arrangement permits the spring 116 to rotate about the length of the shaft 118 when a downward force denoted by the arrow 126 on FIG. 1 is applied to the bottom end 108 of the diverter plate 102, thereby pivoting the bottom end 108 downward as denoted by the arrow 128. The springing action of the rubber dampers 122 continually urges the spring 116 to return to its original position, and once the downward force has decreased sufficiently the diverter plate 102 pivots upward as denoted by the arrow 130 and returns to its original position.

Figure 5:
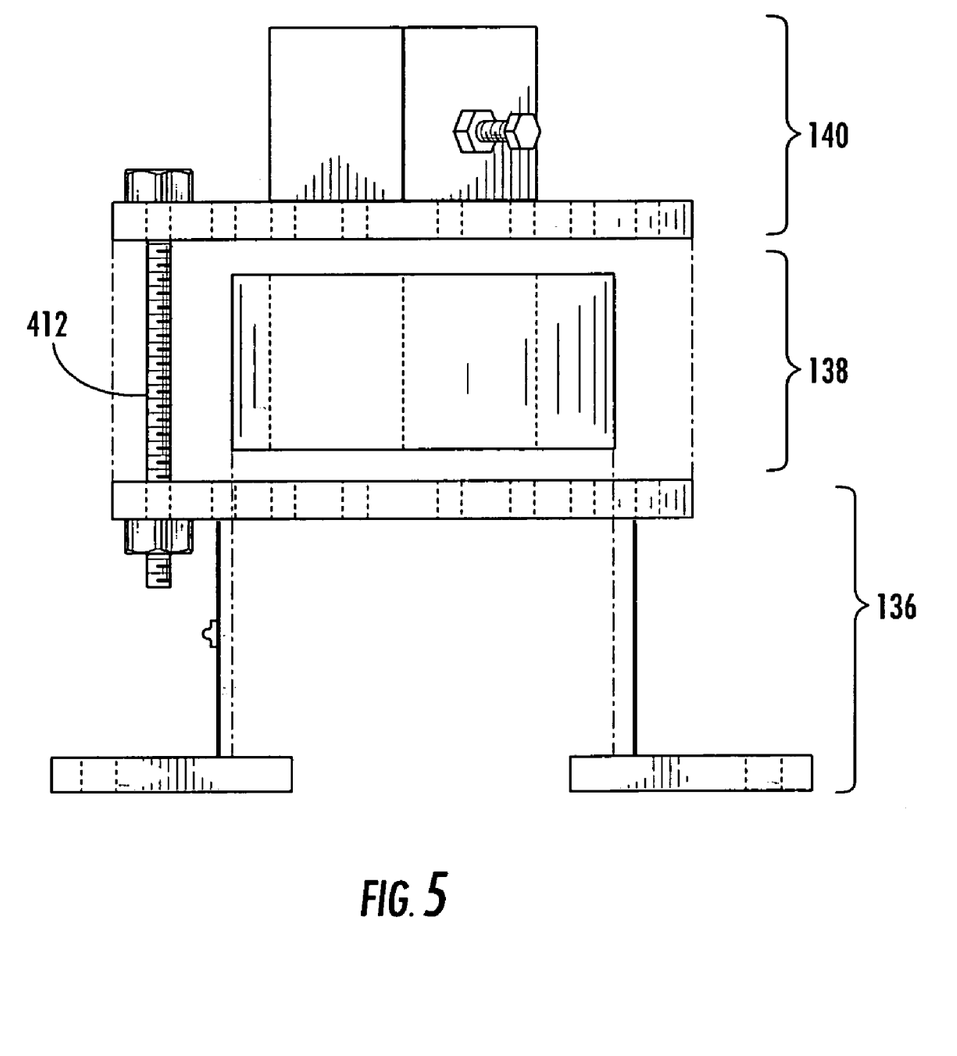
FIG. 5 is an exploded side elevation view of an adjustable locking mount of the flow control apparatus of FIG. 1.

One adjustable locking mount 112 is attached to the first end 132 of the shaft 118, and another adjustable locking mount 112 is attached to the second end 134 of the shaft 118. Each adjustable locking mount 112 is substantially made of steel and/or the same types of materials as the diverter plate 102. The adjustable locking mounts 112 allow the shaft 118 to be rotated such that the diverter plate 102 is positioned at a desired angle in its original position, then allow the shaft 118 to be locked or fixed in that chosen position until such time as the angle of the diverter plate 102 is to be subsequently changed. The adjustable locking mounts 112 also allow the shaft 118 to be raised or lowered within the chute. As shown in FIG. 5, each adjustable locking mount 112 comprises a base plate assembly 136 that attaches the mounting assembly 104 to the chute, a bushing 138 that guides the shaft 118, and an external locking disc assembly 140 that adjusts the positioning of the shaft 118.

Figure 6:
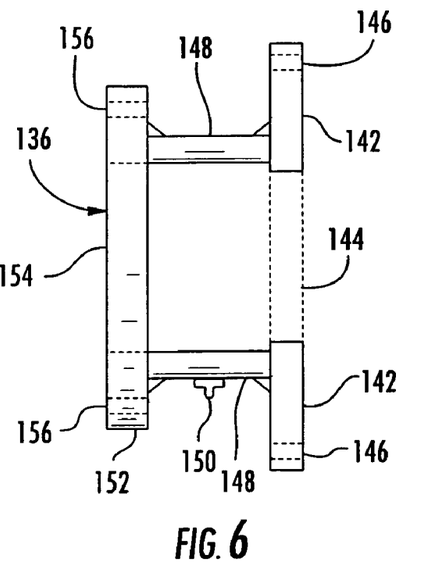
FIG. 6 is a side elevation view of a base plate assembly of the adjustable locking mount of FIG. 5.
Figure 7:
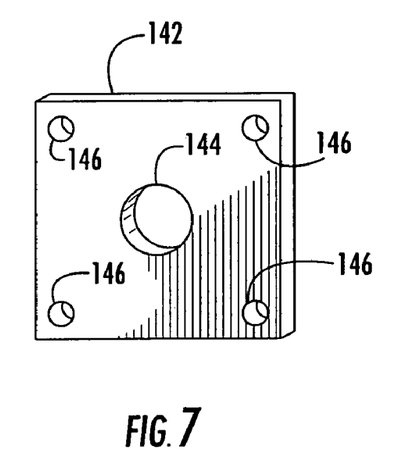
FIG. 7 is a perspective view of a mounting plate of the base plate assembly of FIG. 6.
Figure 8:
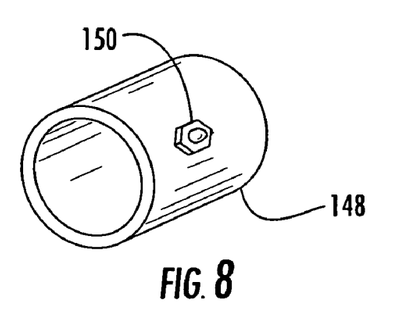
FIG. 8 is a perspective view of a tube of the base plate assembly of FIG. 6.
Figure 9:
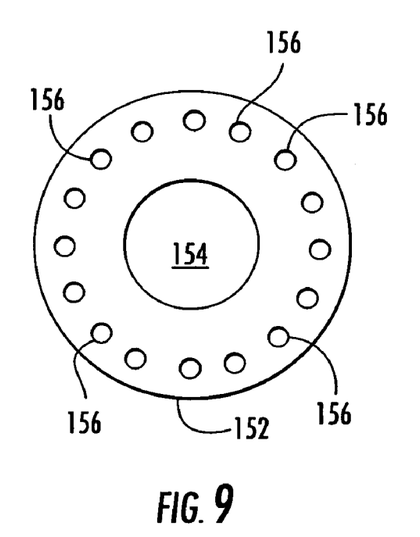
FIG. 9 is a plan view of a first alignment disc of the base plate assembly of FIG. 6.

The components of the base plate assembly are shown in FIGS. 6-9. Specifically, a one-half inch thick square mounting plate 142 measuring 10 inches by 10 inches has a three and one-half inch diameter center hole 144 and four three-quarter inch diameter corner holes 146 as shown in FIG. 7. Bolts are placed through the corner holes 146 to attach the mounting plate 142 to the chute. A circular tube 148 having an inside diameter of four inches, an outside diameter of five inches, and a length of two inches is welded to the mounting plate 142 such that the opening of the tube 148 is aligned with the center hole 144 of the mounting plate 142. A grease fitting 150 is located on the side of the tube 148 as shown in FIG. 8. As shown in FIG. 9, a first alignment disc 152 measuring about eight inches in diameter and about one-half inch thick having a first center alignment hole 154 about four inches in diameter and a series of about five-eighths inch diameter outer alignment holes 156 arranged around the first center alignment hole 154 is welded to the tube 148 such that the first center alignment hole 154 is aligned with the opening of the tube 148. Thus, the tube 148 is sandwiched between the mounting plate 142 and the first alignment disc 152, and the center hole 144, the opening of the tube 148, and the first center alignment hole 154 are all aligned as shown in FIG. 6.

Figure 10:
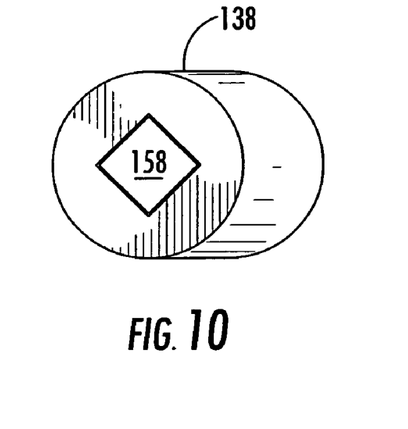
FIG. 10 is a perspective view of a bushing of the adjustable locking mount of FIG. 5.

The bushing 138 is shown in FIG. 10. It is cylindrical with a diameter of about three and fifteen-sixteenths inches and a length of about two and three-eighths inches. It has a center square hole 158 along its entire length measuring about two and one-sixteenth inches per side. The bushing 138 fits snugly within the tube 148.

Figure 11:
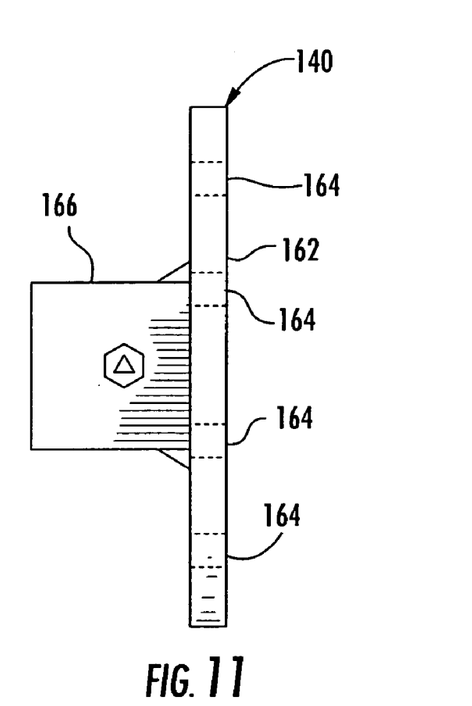
FIG. 11 is a side elevation view of an external locking disc assembly of the adjustable locking mount of FIG. 5.
Figure 12:
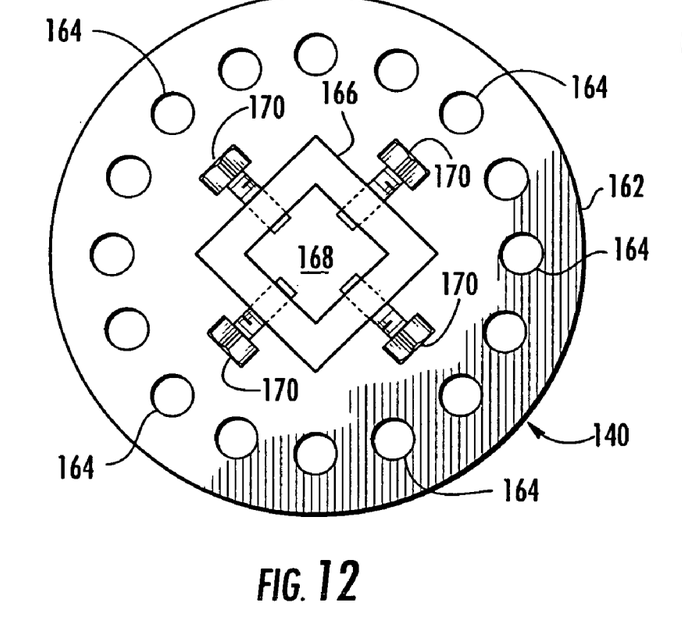
FIG. 12 is a plan view of the external locking disc assembly of FIG. 11.

As shown in FIGS. 11 and 12, the external locking disc assembly 140 has a second alignment disc 162 measuring about eight inches in diameter and about one-half inch thick. The second alignment disc 162 has a series of about five-eighths inch diameter outer secondary alignment holes 164 arranged along its perimeter, and it is welded to an external locking disc block 166 measuring about two inches in depth and having a length and width of about two and three-fourths inches. An external locking disc hole 168 measures about two and one-fourth inches square and penetrates through the center of the external locking disc block 166 and the second alignment disc 162. Adjustment screws 170 penetrate through about one-half inch diameter holes in about the center of each side of the external locking disc block 166 and end within the external locking disc hole 168.

Figures 13, 14:
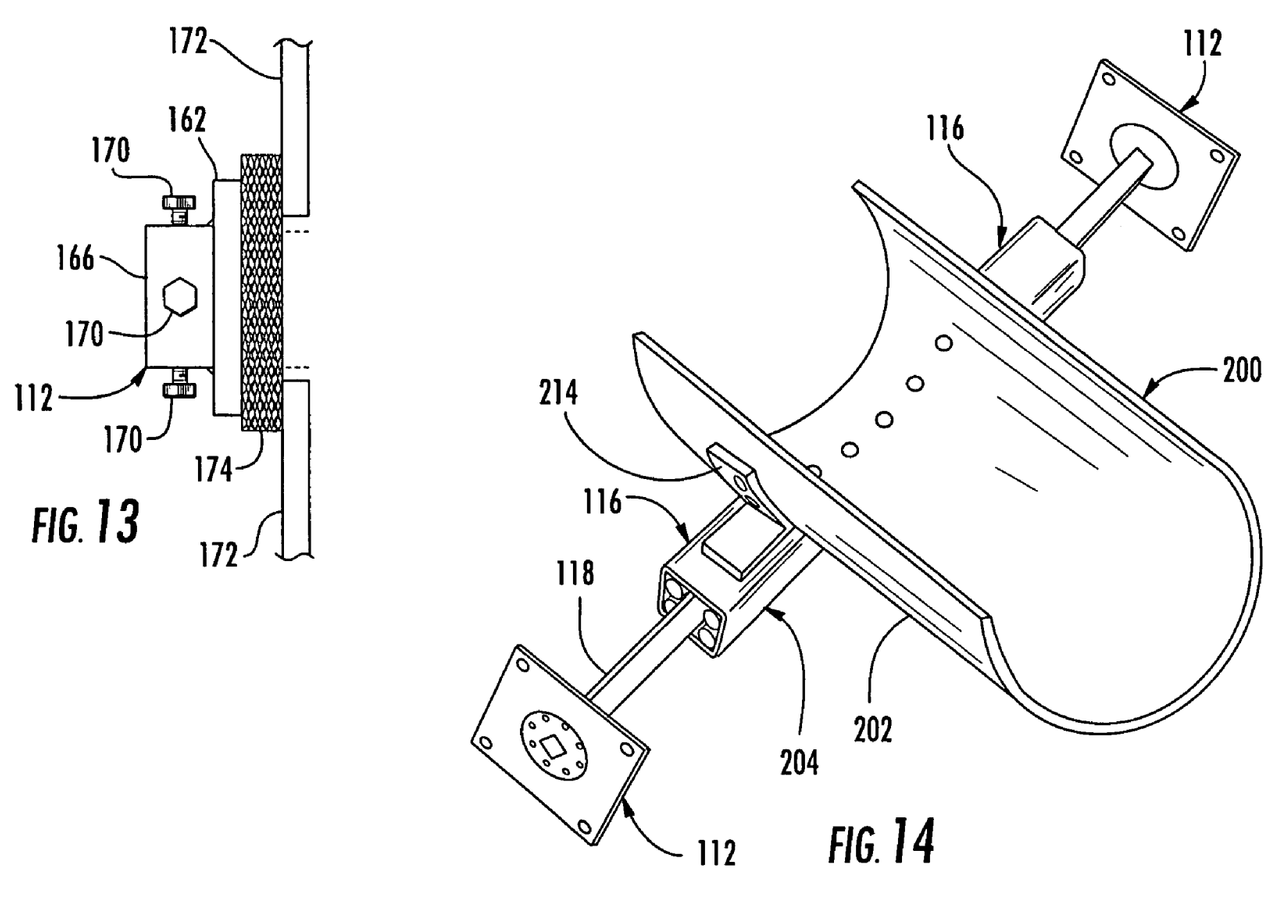
FIG. 13 is a side elevation view of the adjustable locking mount of FIG. 5 attached to a chute and showing a dust seal.
FIG. 14 is a perspective view of an alternate embodiment of the flow control apparatus of the present invention with a concave diverter plate.

As shown in FIG. 13, the adjustable locking mount 112 is attached to the chute wall 172, and a dust seal 174 made of foam rubber or similar material and measuring about one inch thick is placed between and/or around the adjustable locking mount 112 and the chute wall 172 so as to minimize the escape of dust out of the chute wall 172 as the material falls downward within the chute 172. The dust seal 174 is preferably a collar or ring-shaped piece of foam rubber that fits tightly the area where the adjustable locking mount 112 contacts the chute wall 172. Alternative but functionally similar or equivalent materials and/or parts may be used to minimize dust emissions emanating from within the chute 172.

FIG. 14 shows an alternate embodiment of a flow control apparatus 200 having a concave shaped diverter plate 202. The concave shaped diverter plate 202 is in all respects other than shape substantially equivalent to the aforementioned diverter plate 102. The alternate flow control apparatus 200 has a alternate mounting assembly 204 that is substantially equivalent to the aforementioned mounting assembly 104 in all respects other than its means of attachment to the concave shaped diverter plate 202. In particular, a concave shaped bracket 214 is used to support the concave shaped diverter plate 202, rather than the bracket 114. The concave shaped bracket 214 is substantially functionally equivalent to the bracket 114, and is made of the same materials as the bracket 114.

Figure 15:
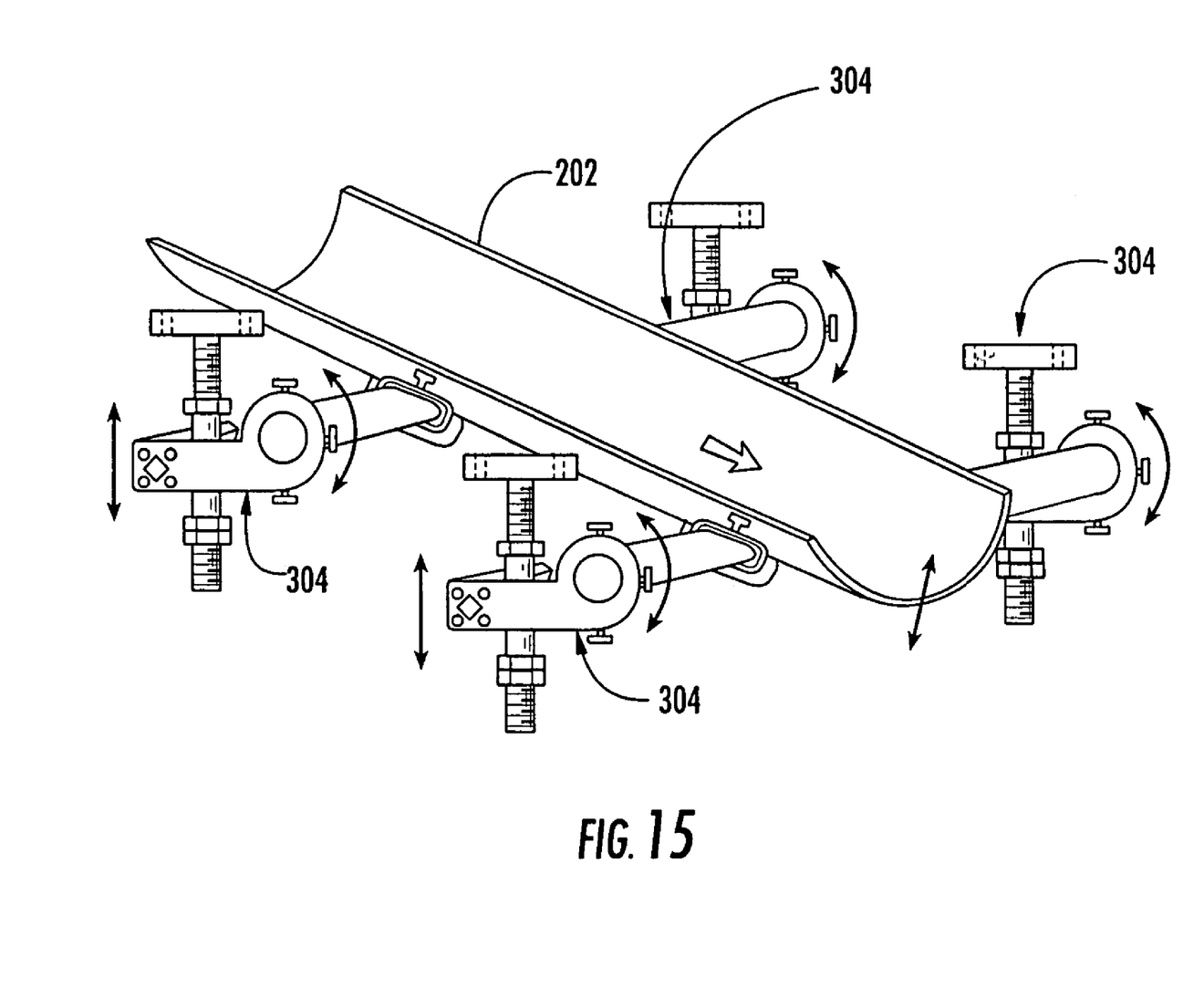
FIG. 15 is a perspective view of an alternate embodiment of the flow control apparatus of the present invention with multiple mounting assemblies.

As shown in FIG. 15, more than one mounting assembly 304 can be used to mount the diverter plate 102, 202 within the chute 172.

Figure 16:
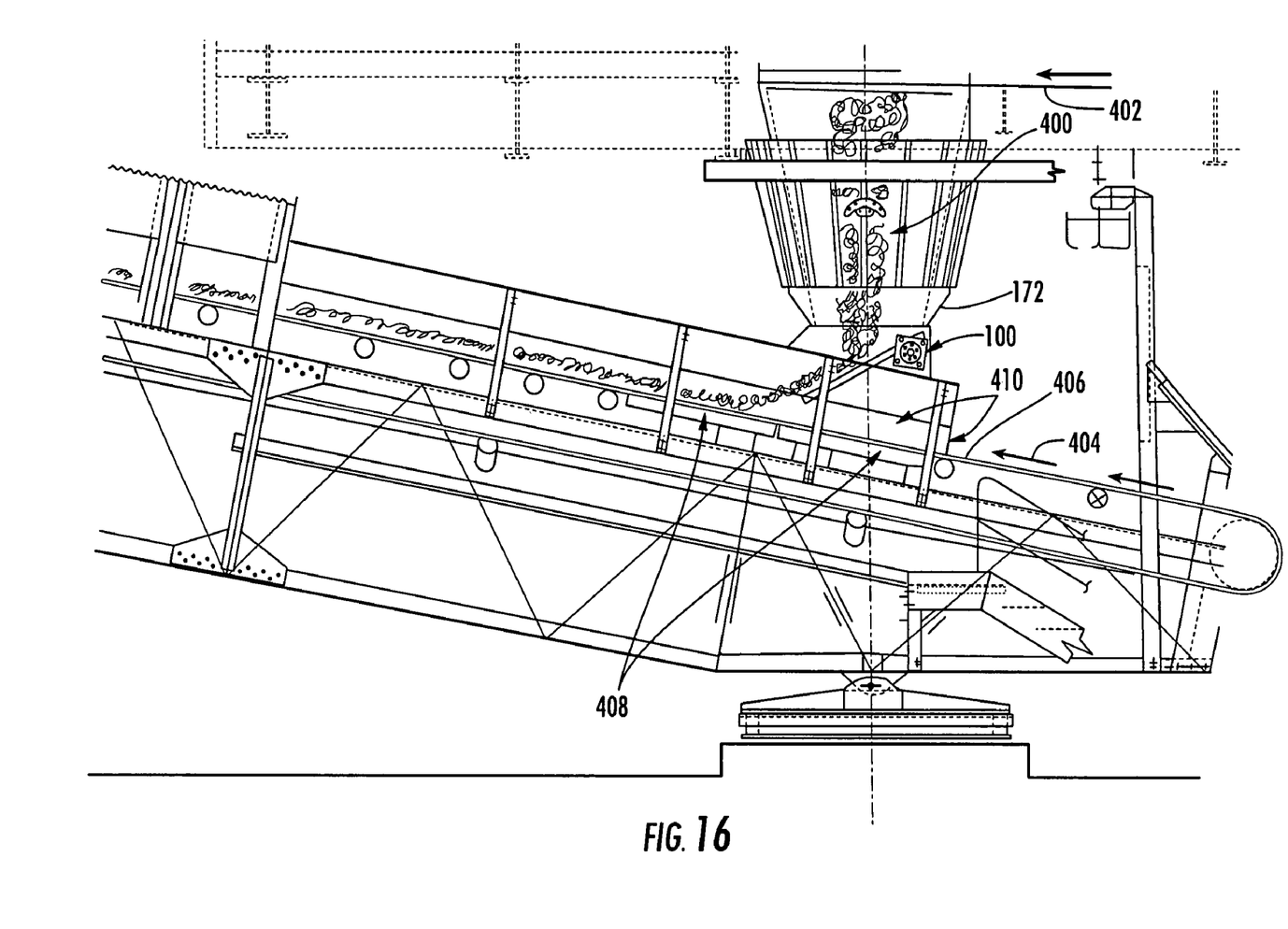
FIG. 16 is a side elevation view of the flow control apparatus of FIG. 1 installed in a chute and diverting material falling onto a conveyor belt.

FIG. 16 shows the flow control apparatus 100 mounted to the chute 172 such that material 400 falling from a first conveyor belt 402 and down through the chute 172 is diverted by the flow control apparatus 100 in a general direction of travel 404 of a second conveyor belt 406, and the material 400 thereafter falls with a reduced force onto the second conveyor belt 406. Although the flow control apparatus 100 is shown attached near the bottom of the chute 172, the apparatus 100 is also suitable for installing at the top of the chute 172 and in different locations throughout the chute 172. FIG. 16 further depicts conventional impact beds 408 that have traditionally been used to reduce the force of the impact of falling material 400 on conveyor belts 406. When the flow control apparatus 100 is used, the use of conventional impact beds 408 is optional because the flow control apparatus 100 itself reduces the force of the impact of falling material 400 on the conveyor belt 406. FIG. 16 also depicts conventional external skirt board 410 that has traditionally been used to minimize spillage of material 400 off of conveyor belts.

Conventional systems use these external skirt boards 410 on the sides of the second conveyor belt 406 to keep the material 400 on the second conveyor belt 406 as the material 400 drops from the chute 172. The flow control apparatus 100 improves upon this conventional setup by allowing the material 400 to be loaded onto a predefined spot, e.g., the center, of the second conveyor belt 406 by simply adjusting the position of the diverter plate 102. Also, the flow control apparatus 100 loads the material 400 on the second conveyor belt 406 in the direction 404 that the second conveyor belt 406 is traveling. Thus, the flow control apparatus 100 reduces spillage of the material 400, as well as, reduces damage to the second conveyor belt 406 by eliminating the heavy impact of the material 400 onto the second conveyor belt 406.

The diverter plate 102 of the present invention is described in terms of being used in combination with a conventional chute for transferring material from a first conveyor belt 402 to a second conveyor belt 406 (the first conveyor belt 402 being above the second conveyor belt 406), but this is for convenience. The apparatus and system of the present invention can be used with any other system directed to transferring material 400 onto a conveyor belt or other transporting means that needs to be protected from impact.

In use, each locking mount 112 is attached to opposite sides of the chute 172 such that the diverter plate 102 is positioned within the chute 172 at a desired position above the second conveyor belt 406. The ends 132, 134 of the shaft 118 project through the center hole 144, the center square hole 158, the first center alignment hole 154, and the external locking disc hole 168. The adjustment screws 170 are tightened to hold the shaft 118 in position. A threaded alignment bolt 412 passes through one of the outer alignment holes 156 and one of the outer secondary alignment holes 164, thereby locking the shaft 118 in an immobilized position. The shaft 118 can be rotated to another desired position by removing the threaded alignment bolt 412, rotating the second alignment disc 162 such that different outer alignment holes 156 and outer secondary alignment holes 164 are aligned, and reinserting the threaded alignment bolt 412 through any of the newly aligned outer alignment holes 156 and corresponding outer secondary alignment holes 164. Multiple threaded alignment bolts 412 may alternatively be used. Each locking mount 112 may alternatively be attached to other transfer point equipment rather than to the chute 172, so long as the apparatus 100 is positioned such that the material 400 flows onto the diverter plate 102.

Also, the diverter plate 102 pivots between a default position, wherein the diverter plate 102 may be along a generally horizontal axis parallel to the second conveyor belt 406, and an unload position, wherein the bottom end 108 has pivoted or rotated downward toward the top surface of the conveyor belt 406. The diverter plate 102 remains in the unload position while material 400 is dropped onto the diverter plate 102 for transfer to the second conveyor belt 406. Once the material 400 stops flowing onto the diverter plate 102, the diverter plate 102 returns to the default position. When being used to transfer coal, the bottom end 108 of the diverter plate 102 is preferably located about six to about twelve inches from the top surface of the second conveyor belt 406 and the angle of the diverter plate 102 in the unload position is about forty-five degrees. This distance and angle ensures an efficient and clean transfer of the coal. However, it should be recognized that the exact positioning and angle of the diverter plate 102 may be changed to accommodate different types of material 400 and any number of transfer systems. For example, if the conveyor belt 406 under the diverter plate 102 has pre-existing material 400 on it, then the bottom end 108 of the diverter plate 102 must be a higher distance from the top surface of the conveyor belt 406 to prevent the bottom end 108 from hitting the existing material 400. This holds true for very heavy material 400 as well because heavy material 400 should be unloaded close to the top surface of the second conveyor belt 406 to prevent damage. Also, when in the unload position, the diverter plate 102 needs to be at an angle such that the material 400 traveling over the diverter plate 102 will roll off of the diverter plate 102 due to normal gravitational forces. Thus, the angle of the diverter plate 102 in the unload position will depend on the size and weight of the material 400 being transferred. It would be readily apparent to one of ordinary skill in the relevant art to determine the proper height and angle of a diverter plate 102 in the unload position needed for a specific application of this invention.

The spring 116 allows the diverter plate 102 to pivot between the default position and the unload position, to absorb the impact of the material 400, similar to the action of a diving board at a swimming pool (although the diverter plate 102 itself is preferably not flexible or bendable), and to divert the material 400 ahead of the normal impact area with forward motion and speed in the direction 404 of travel of the second conveyor belt 406, thereby lessening the impact of the material 400 on the belt and blow out on the external skirt board 410. The optional vibrator 450 vibrates the diverter plate 102 to assist in the flow of material 400, especially when such material 400 is sticky, to keep the diverter plate 102 clean, and/or to assist in keeping the material 400 flowing off the diverter plate 102 where the diverter plate 102 is positioned nearly parallel to the second conveyor belt 406.

Figures 17, 18, 19:
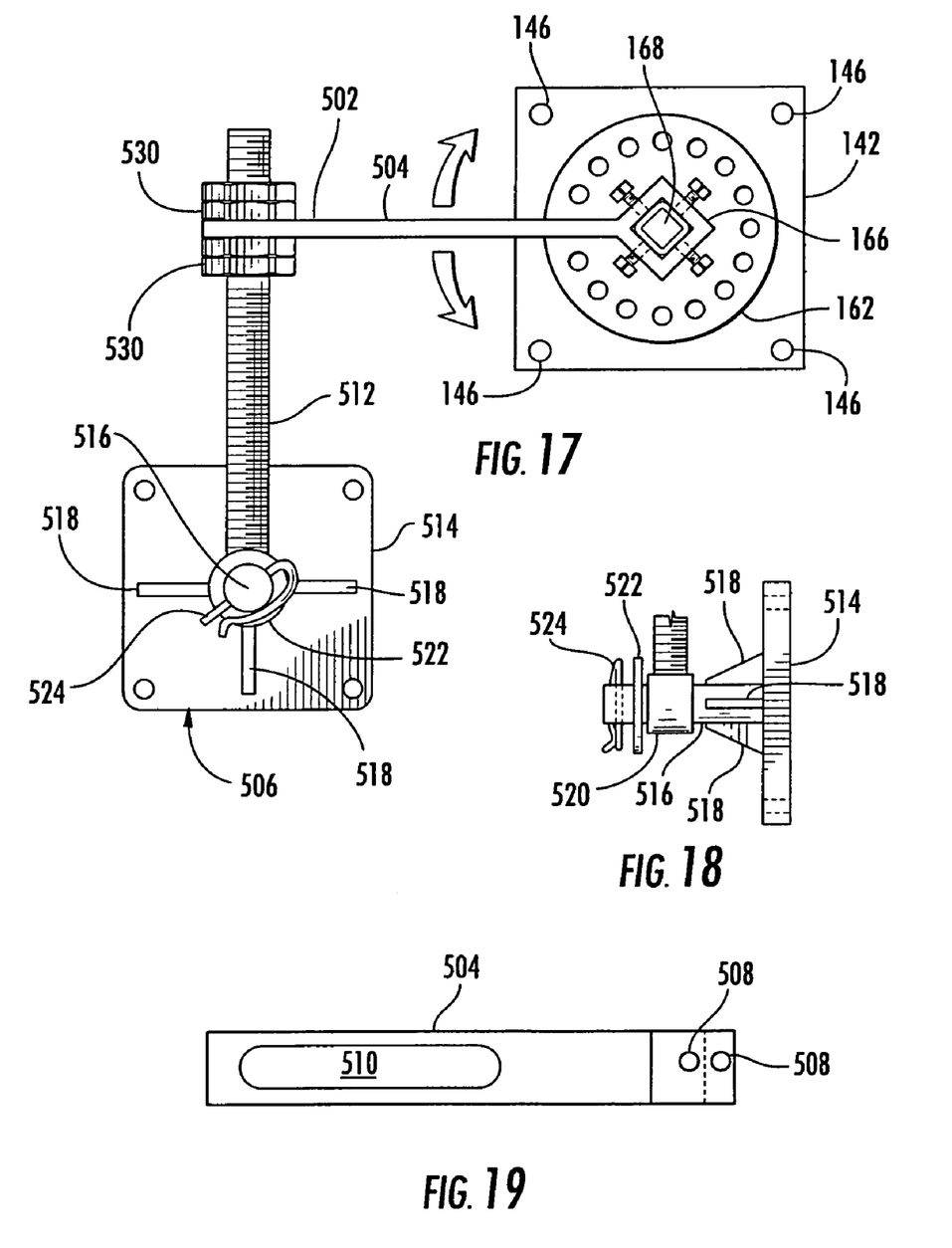
FIG. 17 is a front elevation view of a mechanical adjuster attached to the external locking disc assembly of the flow control apparatus of FIG. 1.
FIG. 18 is a side elevation view of a mechanical adjuster mount of the mechanical adjuster of FIG. 17.
FIG. 19 is a plan view of a mechanical adjuster arm of the mechanical adjuster of FIG. 17.

The flow control apparatus 100 also optionally comprises a mechanical adjuster 502 as shown in FIGS. 17-19. The mechanical adjuster 502 is comprised of a mechanical adjuster arm 504, an allthread 512, and a mechanical adjuster mount 506. The mechanical adjuster arm 504 is attached to the external locking disc block 166 and/or the shaft 118 using set screws 508 or similar means, and extends as a shaft perpendicularly away from the end of the shaft 118. A slot 510 penetrates the mechanical adjuster arm 504 at the end distal from the shaft 118. The allthread or threaded rod 512 fits through the slot 510 and is secured in the slot using nuts 530 threaded on the allthread 512 on either side of the mechanical adjuster arm 504. The allthread 512 is positioned roughly perpendicular to the mechanical adjuster arm 504. The end of the allthread 512 distal from the nuts 530 is attached to the mechanical adjuster mount 506. Specifically, a mounting plate 514 is bolted or otherwise attached to a stationary object. A short bar 516 projects from a face of the mounting plate 514. The bar 516 is supported by gussets 518. A short tube 520 slides over the bar 516 and supports the allthread 512. The tube 520 is held in place using a washer 522 and a clip 524. Thus, rotating the nuts 530 clockwise or counterclockwise moves the mechanical adjuster arm 504, thereby rotating the shaft 118 in a controlled manner. Other functionally similar means may be used for controlled rotation of the shaft 118, such as air, hydraulic, water, or gear driven mechanisms.

An embodiment of the method of the present invention comprises the steps of installing a flow control apparatus 100 on a conveyor belt transfer point chute 172 as described herein, activating a first conveyor belt 402 that feeds material 400 to the chute 172, and activating a second conveyor belt 406 that receives the material 400 from the chute 172, wherein the flow control apparatus 100 diverts the material 400 as the material 400 falls from the first conveyor belt 402 to the second conveyor belt 406 as disclosed herein.

Although the present invention is described herein as suitable for use with conveyor belts 402, 406 and chutes 172, the apparatus and method of the present invention is also suitable for use in any application requiring a means for diverting and/or directing the flow or movement of materials 400 from one means of conveyance to another means of conveyance or into storage. Thus, the present invention is suitable for use in directing the flow of any bulk material and/or packages of any material, such as sacks of cement. The present invention is also suitable for use at loading points, stacking points, discharge points, and other transfer points. The present invention is therefore suitable for use in stacking material 400 in a stockpile, in the hold of a ship, or in similar locations.

The present invention is also suitable for use in multiple locations along a flow of materials 400. Thus, the flow control apparatus 100 can be used multiple times during the transfer of material 400 to accommodate large fall distances or to turn the material 400 in multiple different directions for transfer. Such use of the flow control apparatus 100 is ideal as the diverter plate 102 is automatically positioned above the second means of conveyance when the apparatus 100 is not in use, and the diverter plate 102 is automatically lowered toward the second means of conveyance when the apparatus 100 is in use. The drop height from the diverter plate 102 to the second means of conveyance is thus automatically reduced as needed.

The dimensions shown and described herein are for convenience purpose only. It would be readily apparent to one of ordinary skill in the relevant art to design, build, install, and operate an apparatus and system described herein using different measurements depending on the target conveyor belt 406 and material 400 to be used with the apparatus and system. Also, the use of conventional torsion springs is for convenience. It would be readily apparent to one of ordinary skill in the relevant art to use a functionally comparable and/or equivalent means for pivoting the diverter plate 102 of the present invention. For example, air bags, water bags, hydraulic means, and/or other comparable or equivalent means may be used.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. An apparatus for diverting material from a first conveyance means to a second location, comprising: a diverter plate, having a top end, a bottom end, and a material conveying surface disposed between the top end and the bottom end, the diverter plate pivotable from an upper position to a lower unload position in response to force exhibited by the presence of conveyed material on the material conveying surface thereby facilitating flow of the material into the second location; and a mounting assembly attached to the diverter plate, the mounting assembly having a biasing means for resiliently urging the diverter plate toward the upper position in the substantial absence of material on the material conveying surface, wherein the mounting assembly comprises at least one adjustable locking mount.

2. The apparatus of claim 1, wherein the diverter plate has a shape selected from the group consisting of: U-shape, V-shape, concave shape, cup shape, planar shape, flat shape, and spoon-shape.

3. The apparatus of claim 1, wherein the mounting assembly comprises a carrier spring assembly and two adjustable locking mounts.

4. The apparatus of claim 3, wherein the carrier spring assembly comprises a bracket to which the diverter plate is attached, a shaft attached to the two adjustable locking mounts, and a spring attaching the bracket to the shaft that permits resilient rotation of the bracket about the shaft.

5. The apparatus of claim 4, wherein the spring is a neidhart-type rubber torsion spring.

6. The apparatus of claim 3, wherein each adjustable locking mount comprises a base plate assembly, a bushing held in place by the base plate assembly that guides a shaft, and an external locking disc assembly that adjustably holds the shaft in place.

7. The apparatus of claim 3, further comprising a dust seal attached to each adjustable locking mount.

8. The apparatus of claim 1, wherein the diverter plate and the mounting assembly are substantially made of materials selected from the group consisting of: metal, steel, stainless steel, wear plate, ultra high molecular weight polyethylene, synthetic resinous fluorine-containing polymers, ceramic, plastic, and urethane compounds.

9. The apparatus of claim 1, further comprising a second mounting assembly attached to the diverter plate.

10. The apparatus of claim 1, wherein the first conveyance means comprises a first conveyor belt, and wherein the second location comprises a second conveyance means.

11. The apparatus of claim 10, wherein the material flows off of the diverter plate in a direction of travel of the first conveyor belt.

12. An apparatus for diverting material from a first conveyance means to a second location, comprising: a diverter plate, having a top end, a bottom end, and a material conveying surface disposed between the top end and the bottom end, the diverter plate pivotable from an upper position to a lower unload position in response to force exhibited by the presence of conveyed material on the material conveying surface thereby facilitating flow of the material into the second location; and a mounting assembly attached to the diverter plate, the mounting assembly having a biasing means for resiliently urging the diverter plate toward the upper position in the substantial absence of material on the material conveying surface, wherein the diverter plate is made of a substantially rectangular sheet of steel.

13. An apparatus for diverting material from a first conveyance means to a second location comprising:
    a diverter plate, having a top end, a bottom end, and a material conveying surface disposed between the top end and the bottom end, the diverter plate pivotable between an upper position and a lower unload position; and
    a mounting assembly attached to the diverter plate that pivots the bottom end downward from the upper position to the lower unload position in response to force exhibited by the presence of conveyed material on the material conveying surface, thereby facilitating a flow of the material into the second location, and pivots the bottom end upward when the material flows off of the material conveying surface of the diverter plate, the mounting assembly comprising a carrier spring assembly and two adjustable lock mounts;
    a shaft extending between and attached to the adjustable locking mounts;
    each adjustable lock mount comprising:
        a base plate assembly comprising a mounting plate having a center hold, a tube attached to the mounting plate, a first alignment disc having a first center alignment hole, wherein the first alignment disc is attached to the tube, and wherein the shaft passes through the center hold, the tube, and the first center alignment hole;
        a bushing held in place by the base plate assembly that guides the shaft; and
        an external locking disc assembly that adjustably holds the shaft in place.

14. The apparatus of claim 13, wherein the external locking disc assembly comprises a second alignment disc and an external locking disc block attached to the second alignment disc, wherein an external locking disc hole passes through the second alignment disc and the external locking disc block, and wherein the shaft passes through the external locking disc hole.

15. The apparatus of claim 14, wherein the first alignment disc has a series of outer alignment holes, wherein the second alignment disc has a series of outer secondary alignment holes, and wherein the second alignment disc is rotatable in relation to the first alignment disc.

16. The apparatus of claim 15, further comprising an alignment bolt passing through one of the outer alignment holes and one of the outer secondary alignment holes.

17. The apparatus of claim 13, wherein the diverter plate has a shape selected from the group consisting of: U-shape, V-shape, concave shape, cup shape, planar shape, flat shape, and spoon-shape.

18. The apparatus of claim 13, wherein the carrier spring assembly comprises a bracket to which the diverter plate is attached, a shaft attached to the two adjustable locking mounts, and a spring attaching the bracket to the shaft that permits resilient rotation of the bracket about the shaft.

19. The apparatus of claim 18, wherein the spring is a neidhart-type rubber torsion spring.

20. The apparatus of claim 13, further comprising a dust seal attached to each adjustable locking mount.

21. The apparatus of claim 13, wherein the diverter plate and the mounting assembly are substantially made of materials selected from the group consisting of:
metal, steel, stainless steel, wear plate, ultra high molecular weight polyethylene, synthetic resinous fluorine-containing polymers, ceramic, plastic, and urethane compounds.

22. The apparatus of claim 13, further comprising a second mounting assembly attached to the diverter plate.

23. The apparatus of claim 13, wherein the first conveyance means comprises a first conveyor belt, and wherein the second location comprises a second conveyance means.

24. An apparatus for diverting material from a first conveyance means to a second location, comprising: a diverter plate, having a top end, a bottom end, and a material conveying surface disposed between the top end and the bottom end; and a mounting assembly attached to the diverter plate that pivots the bottom end downward to a lower unload position when a force exhibited by the presence of conveyed material on the material conveying surface is applied to the diverter plate and pivots the bottom end upward to an upper position when the force abates, wherein the mounting assembly comprises a carrier spring assembly and two adjustable locking mounts, wherein the carrier spring assembly comprises a bracket to which the diverter plate is attached, a shaft attached to the two adjustable locking mounts, and a spring attaching the bracket to the shaft that permits resilient rotation of the bracket about the shaft, and wherein each adjustable locking mount comprises a base plate assembly, a bushing held in place by the base plate assembly that guides the shaft, and an external locking disc assembly that adjustably holds the shaft in place.

25. An apparatus for diverting material from a first conveyance means to a second location, comprising: a diverter plate, having a top end, a bottom end and a material conveying surface disposed between the top end and the bottom end; and a mounting assembly attached to the diverter plate that pivots the bottom end downward to a lower unload position when a force exhibited by the presence of conveyed material on the material conveying surface is applied to the diverter plate and pivots the bottom end upward to an upper position when the force abates, wherein the mounting assembly comprises a carrier spring assembly and two adjustable locking mounts, and wherein each adjustable locking mount comprises a base plate assembly, a bushing held in place by the base plate assembly that guides a shaft attached to the two adjustable locking mounts, and an external locking disc assembly that adjustably holds the shaft in place.

26. A method for diverting material from a first conveyance means into a second location, comprising the steps of:
(a) installing at a conveyor belt transfer point an apparatus for diverting the material, wherein the apparatus comprises a diverter plate, having a top end, a bottom end, and a material conveying surface disposed between the top end and the bottom end; and a mounting assembly having at least one adjustable locking mount and attached to the diverter plate that pivots the bottom end downward to a lower unload position in response to force exhibited by material falling onto the material conveying surface, thereby facilitating a flow of the material into the second location, and pivots the bottom end upward to an upper position when the material flows off of the material conveying surface; (b) adjusting the at least one adjustable locking mount to set an initial angle of inclination of the material conveying surface; and (c) activating the first conveyance means to feed the material to the diverter plate.

27. The method of claim 26, further comprising the step of: (c) activating a second conveyance means that receives the material at the second location, wherein the material flows off of the diverter plate in a direction of travel of the second conveyance means.

* * * * *